United States Patent [19]

Napoles

[11] Patent Number: 5,438,696
[45] Date of Patent: Aug. 1, 1995

[54] METHOD AND APPARATUS FOR CONTROLLING RADIO FREQUENCY INTERFERENCE GENERATED BY A VOLTAGE MULTIPLIER

[75] Inventor: Adrian Napoles, Boynton Beach, Fla.

[73] Assignee: Motorola, Inc., Schaumburg, Ill.

[21] Appl. No.: 96,803

[22] Filed: Jul. 26, 1993

[51] Int. Cl.[6] .................................................. H04B 1/16
[52] U.S. Cl. .................................... 455/343; 455/127; 455/298; 455/299
[58] Field of Search ................. 455/343, 127, 298, 299

[56] References Cited

U.S. PATENT DOCUMENTS 4,053,821  10/1977  Hose, Jr. et al. ..................... 363/60

FOREIGN PATENT DOCUMENTS 1120132  5/1989  Japan ..................................... 455/298

*Primary Examiner*—Edward F. Urban
*Assistant Examiner*—Doris To

*Attorney, Agent, or Firm*—Kelly A. Gardner; John H. Moore

[57] ABSTRACT

A radio communication device (100) having a receiver (110) for receiving a radio frequency (RF) signal includes first and second batteries (140, 175) for generating first and second voltages, respectively, wherein the second voltage is greater than the first voltage. A voltage multiplier (150) coupled to the first battery (140) boosts the first voltage to a third voltage that is greater than the first voltage during a first time period when the receiver (110) is disabled from receiving the RF signal. Other processing circuitry (115, 120) within the radio communication device (100) receives the third voltage and is powered thereby during the first time period when the receiver (110) is disabled from receiving the RF signal. The other processing circuitry (115, 120) receives the second voltage and is powered thereby during a second time period when the receiver (110) is enabled for reception of the RF signal.

10 Claims, 3 Drawing Sheets

METHOD AND APPARATUS FOR CONTROLLING RADIO FREQUENCY INTERFERENCE GENERATED BY A VOLTAGE MULTIPLIER

FIELD OF THE INVENTION

This invention relates in general to voltage multipliers, and more specifically to methods for reducing radio frequency interference generated by voltage multipliers.

BACKGROUND OF THE INVENTION

Paging receivers are battery powered devices which are utilized by subscribers who want to be accessible without being tied to a known location. Typically, in order to meet consumer demand, paging receivers are relatively small and light in weight so that a subscriber can carry a paging receiver without becoming fatigued. Therefore, both the receiver circuitry and the battery for powering the circuitry must be situated in a limited amount of space.

Further consumer demands dictate that the battery life of the battery powering the paging receiver should be long enough that the subscriber is not often inconvenienced by having to replace the battery. In other words, the battery should have a relatively high capacity. It follows, then, that small, high capacity batteries for powering paging receivers typically provide low voltages, i.e., voltages on the order of 1–1.5 volts. In many cases, however, circuitry, such as controllers and microprocessors, included within a paging receiver require higher voltages. As a result, voltage multiplying circuitry is included within the paging receiver for boosting the battery voltage to the higher voltage required by selected circuits within the paging receiver.

Conventionally, voltage multiplying circuitry is coupled to the battery by a switch which is rapidly opened and closed to charge circuit elements of the voltage multiplying circuitry with a current from the battery, thereby generating a higher output voltage for use by the higher voltage paging circuits. This switching unfortunately results in the generation of high frequency harmonic signals which can desensitize the paging receiver. This interference can be so severe that the paging receiver erroneously receives or entirely misses weaker radio frequency signals. Additionally, the high frequency harmonic signals can mix with the radio frequency signals detected by the antenna to produce unwanted signals, i.e., spurious responses, in the intermediate frequency range of the receiver.

Thus, what is needed is a method and apparatus for controlling radio frequency interference generated by voltage multiplying circuitry included in a paging receiver.

SUMMARY OF THE INVENTION

A radio communication device includes a receiver for receiving a radio frequency (RF) signal, a first battery for providing a first voltage for powering the receiver, a voltage multiplier for boosting the first voltage to a second voltage for powering selected circuits included in the radio communication device, a second battery for providing a third voltage greater than the first voltage, and timing circuitry for generating time values. A controller coupled to the first battery, the voltage multiplier, the second battery, the timing circuitry, and the receiver controls the operation thereof.

The voltage multiplier includes an inductor having first and second terminals, wherein the first terminal of the inductor is coupled to the first battery for receiving the first voltage therefrom. The voltage multiplier further includes a diode having a cathode and having an anode coupled to the second terminal of the inductor. A capacitor included within the voltage multiplier has a first terminal coupled to the cathode of the diode and a second terminal coupled to a fourth voltage of approximately zero volts.

A method for controlling radio frequency interference in the radio communication device comprises the step of enabling the voltage multiplier for generation of the second voltage during a first time period in which the receiver is disabled by alternating between coupling the second terminal of the inductor to the fourth voltage and decoupling the second terminal of the inductor from the fourth voltage at a predetermined frequency. The method further comprises the steps of disabling the voltage multiplier during a second time period in which the receiver is enabled and powering the selected circuits with the third voltage provided by the second battery during the second time period.

A radio communication device has a receiver for receiving a radio frequency (RF) signal, timing circuitry for generating time values, and a controller coupled to the receiver and the timing circuitry for generating control signals in response to the time values. The radio communication device comprises a first battery for generating a first voltage for powering the receiver, a voltage multiplier coupled to the first battery for boosting the first voltage to a second voltage that is greater than the first voltage, and circuitry coupled to the receiver and the voltage multiplier for receiving the second voltage and being powered thereby.

A first switch coupled between the receiver and the first battery and to the controller enables the receiver for reception of the RF signal during a first time period when the first switch is closed by the controller and disables the receiver during a second time period when the first switch is opened by the controller. A second switch coupled between the voltage multiplier and a ground voltage and to the controller disables the voltage multiplier during the first time period, when the second switch is held open by the controller, such that the second voltage is not generated by the voltage multiplier. The second switch enables the voltage multiplier during the second time period when the second switch is alternately opened and closed by the controller at a predetermined frequency such that the second voltage is generated by the voltage multiplier.

Additionally, a second battery generates a third voltage greater than the first voltage. The radio communication device further comprises a third switch coupled between the second battery and the circuitry and to the controller. The third switch is closed during the first time period to couple the circuitry to the second battery such that the circuitry receives the third voltage and is powered thereby. The third switch is opened by the controller during the second time period.

DESCRIPTION OF A PREFERRED EMBODIMENT

Figure 1:
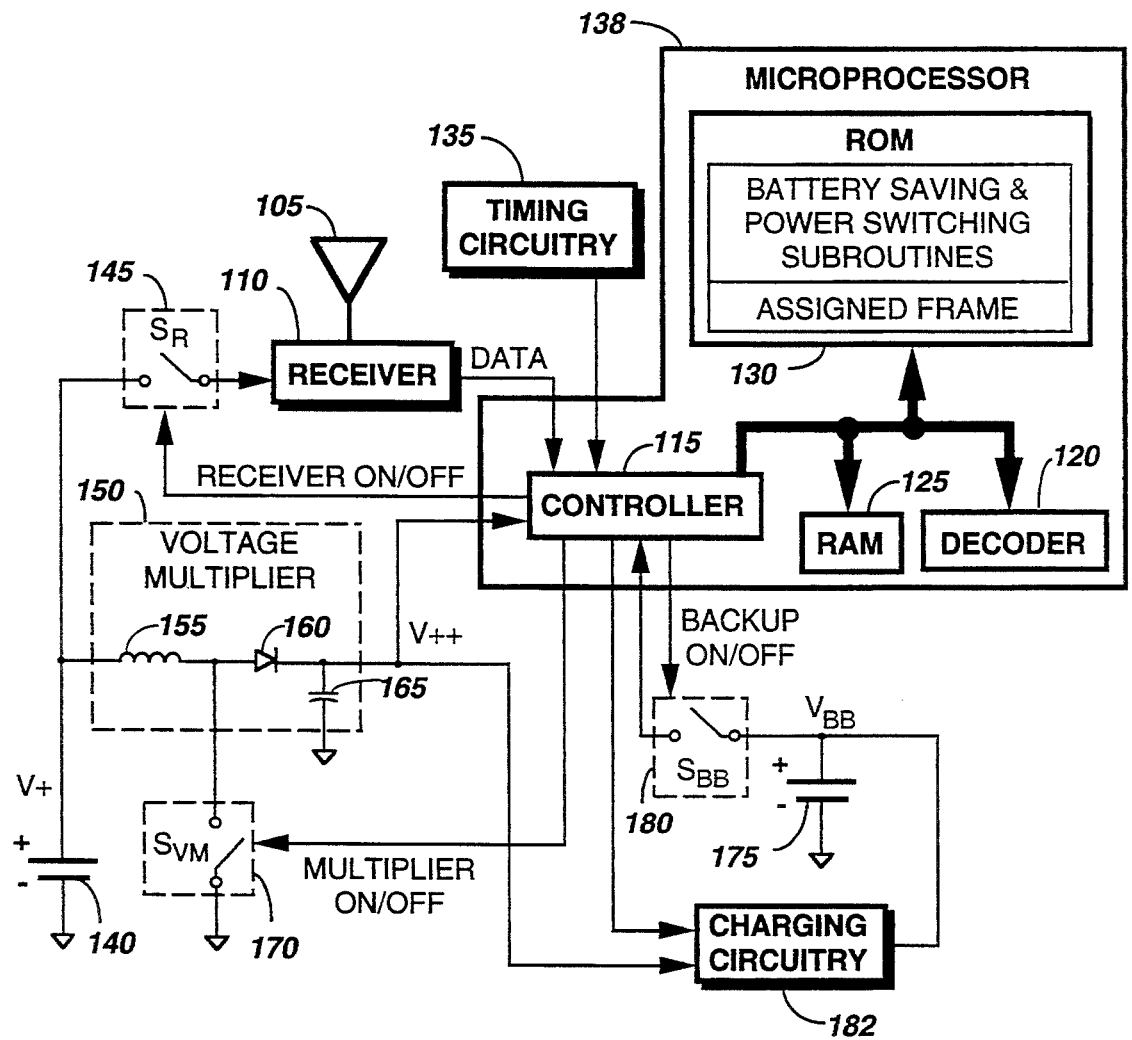
FIG. 1 is an electrical block diagram of a radio communication device in accordance with the present invention.

FIG. 1 is an electrical block diagram of a radio communication device 100 in accordance with the present invention. The radio communication device 100 preferably comprises an antenna 105 for receiving a radio frequency (RF) signal and a receiver 110 coupled to the antenna for demodulating the received signal to generate data therefrom. The radio communication device.100 further comprises a controller 115 for controlling the operation of the radio communication device 100 and a decoder 120 coupled thereto for receiving the data and recovering therefrom message information included in the RF signal. The message information is typically stored in a temporary memory, such as a random access memory (RAM) 125. Further included in the radio communication device 100 is a read only memory (ROM) 130 coupled to the controller 115 for storing subroutines which are executed by the controller 115 during operation of the radio communication device 100. Additionally, timing circuitry 135 is coupled to the controller 115 for generating time values utilized by the controller 115 during system operation. The timing circuitry 135 can, for example, comprise a crystal (not shown) for generating a reference signal and an oscillator coupled to the crystal for generating the time values from the reference signal.

It will be appreciated by one of ordinary skill in the art that the controller 115, the decoder 120, the RAM 125, and the ROM 130 can be included in a microprocessor 138, such as an MC68HC05 microprocessor manufactured by Motorola, Inc. Alternatively, the recited elements can be implemented using hard-wired logic capable of performing equivalent operations.

According to the present invention, the radio communication device 100 is battery powered and therefore includes a main battery 140 for providing a first voltage V+. The main battery 140 is preferably a primary cell, such as a conventional AA or AAA cell, which is small in size and which provides a voltage V+ on the order of 1.0–1.5 volts. The receiver 110 is coupled, via a switch 145, to the main battery 140 for receiving power therefrom. The switch 145 is preferably opened to disable the receiver 110 during times when reception of the RF signal is not desired and closed to enable the receiver 110 during times when reception of the RF signal is desired. The switch 145 is preferably opened and closed in accordance with conventional battery saving techniques. In the POCSAG (Post Office Code Standardization Advisory Group) radio signaling protocol, for example, each paging device is assigned to a particular frame, during transmission of which the paging device receives message information. During transmission of other frames, high current circuits, such as the receiver, can be turned off to save current and thereby extend the battery life.

Other circuits within radio communication device 100, such as the controller 115 and the decoder 120 included in the microprocessor 138, require a higher voltage than that provided by the main battery 140. Therefore, the radio communication device 100 further comprises a voltage multiplier 150 for boosting the voltage to a higher voltage V++ in a conventional manner. The voltage multiplier 150 can, for example, include an inductor 155 having a first terminal which is coupled to the positive side of the main battery 140. A diode 160 is coupled at the anode side to the second terminal of the inductor 155, and a capacitor 165 is coupled between the cathode side of the diode 160 and ground. The voltage V++ provided at the output of the voltage multiplier 150 is generated by alternately coupling the second terminal of the inductor 155 to ground and decoupling the second terminal of the inductor 155 to ground at a predetermined frequency, preferably 83 kHz. This can easily be accomplished by placing a switch 170 which is controlled by the controller 115 between the second terminal of the inductor 155 and ground. The controller 115 can then direct the opening and closing of the switch 170 at the correct frequency.

As is well known to one of ordinary skill in the art, the switching of the voltage multiplier 150 unfortunately generates high frequency harmonics which can interfere with the operation of the receiver 110. More specifically, the high frequency harmonics raise the noise floor of the receiver 110, thereby desensitizing the receiver 110 so that weaker signals can be difficult to detect. In some situations, the desensitization can be so severe that a signal is missed entirely. Also, the harmonics produced by the voltage multiplier 150 can mix with radio frequency signals to produce undesired signals in the intermediate frequency range of the receiver 110.

According to the present invention, therefore, the radio communication device 100 further comprises a backup battery 175 for powering the high voltage circuits, e.g., the controller 115 and the decoder 120, of the radio communication device 100 when the receiver 110 is enabled. A switch 180 coupled between the backup battery 175 and the high voltage circuits is closed by the controller 115 when the receiver 110 is enabled. At approximately the same time, the switch 170 coupled between the voltage multiplier 150 and ground is opened, thereby disabling the voltage multiplier 150. Preferably, the backup battery 175 is a rechargeable cell which provides a voltage $V_{BB}$ that is high enough to power the high voltage circuits of the radio communication device 100. The backup battery 175 can be, for example, a 3 volt lithium or nickel-cadmium cell which is re-charged in a manner well known to one of ordinary skill in the art. By way of example, during time periods when the receiver 110 is disabled, conventional charging circuitry 182 can be employed to fast-charge or trickle-charge the backup battery 175 with the voltage V++ generated by the voltage multiplier 150 and a predetermined current. For instance, a current for fast-charging the backup battery 175 could be approximately 30 milliamps, while a current for trickle-charging the backup battery 175 could be approximately 0.1 milliamp.

In the manner described above, the voltage multiplier 150 generates V++ for powering the high voltage circuits during time periods when the receiver 110 is disabled, i.e., when the switch 145 is open. During these time periods, the RF interference generated by the voltage multiplier 150 is irrelevant because no RF signal is being received. When the receiver 110 is enabled, i.e., when the switch 145 is closed, the voltage multiplier 150 is disabled, and high voltage circuits of the radio communication device 100 are powered by the backup battery 175. Therefore, the RF interference generated by the voltage multiplier 150 is eliminated during times when the receiver 110 is operating, which results in greater paging sensitivity and improved spurious response of the receiver 110.

The backup battery 175 preferably operates in a conventional manner as well. More specifically, the backup battery 175, rather than the main battery 140, provides power to all circuits of the radio communication device 100 as necessary. For instance, the backup battery 175 can be switched on when the main battery 140 is depleted or removed from the radio communication device 100.

Figure 2:
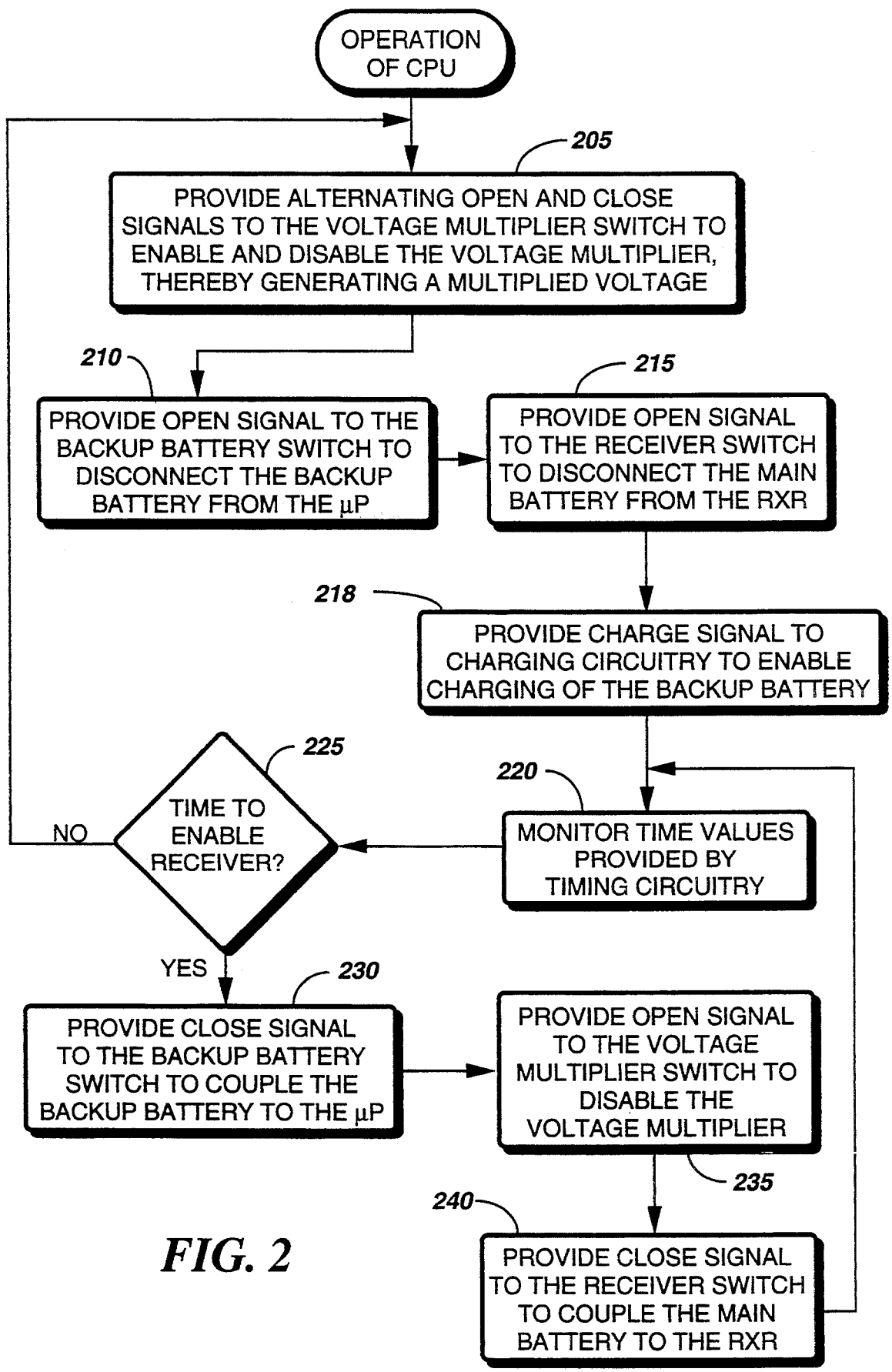
FIG. 2 is a flowchart illustrating the operation of a controller included in the radio communication device of FIG. 1 in accordance with the present invention.

Referring next to FIG. 2, a flowchart depicts the operation of the controller 115 in accordance with the present invention. At power up, the controller 115 begins, at step 205, to open and close the switch 170 at the predetermined frequency, e.g., 83 kHz, in response to which the voltage multiplier 150 generates V++. During this time, the switch 180 coupled to the backup battery 175 remains open, at step 210, and the switch 145 coupled to the receiver 110 remains open, at step 215. Therefore, as described above, the voltage multiplier 150 generates V++ when the receiver 110 is disabled. During this time, if the backup battery 175 is rechargeable, the controller 115 can also provide, at step 218, a signal to the charging circuitry 182 enabling the charging of the backup battery 175 with V++. Alternatively, in other embodiments of the present invention, the controller 115 could monitor the voltage $V_{BB}$ provided by the backup battery 175 and only enable charging of the backup battery 175 as needed when the receiver 110 is disabled.

In addition to the above-mentioned steps, the controller 115 monitors, at step 220, the time values provided by the timing circuitry 135. When the time value indicates, at step 225, that a transmitted RF signal should be received, e.g., when it is time for an assigned frame, the controller 115 closes, at step 230, the switch 180 coupled to the backup battery 175 and holds, at step 235, the switch 170 open, thereby preventing the operation of the voltage multiplier 150. Additionally, the controller 115 closes the switch 145 to enable the receiver 110, at step 240. In this manner, the high voltage circuits of the radio communication device 100 are powered by the backup battery 175, rather than the main battery 140 and the voltage multiplier 150, when the receiver 110 is enabled. As a result, the receiver 110 is not affected by interference generated by the voltage multiplier 150.

Figure 3:
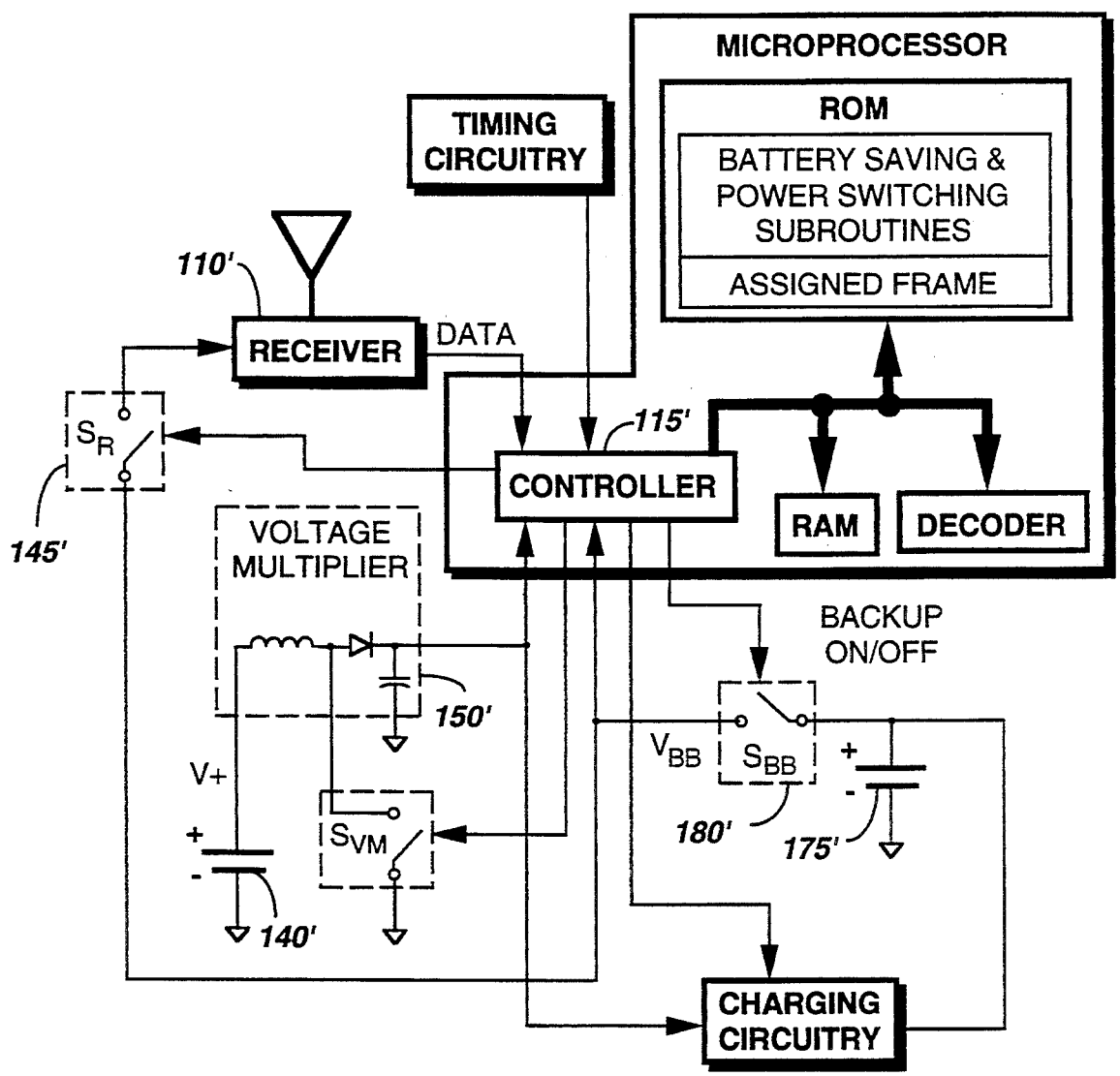
FIG. 3 is an electrical block diagram of an alternate radio communication device in accordance with the present invention.

In some radio communication devices, the receiver, as well as other circuits, requires a voltage greater than that provided by a main battery. This is often true of synthesized receivers. In this situation, a configuration such as shown in FIG. 3 can be used. FIG. 3 is an electrical block diagram of a radio communication device 100', the receiver 110' of which requires a voltage higher than that provided by the main battery 140'. Therefore, the receiver 110' is coupled, via switches 145' and 180', to the backup battery 175'. In this manner, the receiver 110', as well as other high voltage circuits, can be powered by $V_{BB}$ when the switches 145' and 180' are closed by the controller 115'. When the receiver 11' is disabled, the high voltage circuits can again be powered by the voltage V++ generated by the voltage multiplier 150'. It will be appreciated that the use of the switch 180' in addition to the switch 145' allows the backup battery 175' to be employed for reasons other than powering the receiver 110'. For example, when switch 180' is closed and switch 145' is open, the backup battery 175' can provide power to selected circuits in instances when the main battery 140' is not functioning.

In summary, the radio communication device as described above comprises a voltage multiplier for boosting a voltage provided by the main battery such that circuits requiring a higher voltage than that provided by the main battery can still operate. Additionally, the radio communication device includes a backup battery which provides sufficient voltage for powering the high voltage circuits of the radio communication device. During times when the receiver within the radio communication device is disabled, such as when battery saving schemes are implemented, the high voltage circuits operate from the voltage provided by the voltage multiplier. During other times when the receiver is enabled, the high voltage circuits operate from the backup battery, and the voltage multiplier is disabled. In this manner, the high frequency harmonics generated by the voltage multiplier are not present when the receiver is enabled, and, as a result, the receiver is not desensitized.

It may be appreciated by now that there has been provided a method and apparatus for controlling radio frequency interference generated by a voltage multiplier included in a radio communication device.

What is claimed is:

1. A method for controlling radio frequency interference in a radio communication device comprising a receiver for receiving a radio frequency (RF) signal, a first battery for providing a first voltage for powering the receiver, a voltage multiplier for boosting the first voltage to a second voltage for powering selected circuits included in the radio communication device, a second battery for providing a third voltage greater than the first voltage, timing circuitry for generating time values, and a controller coupled to the first battery, the voltage multiplier, the second battery, the timing circuitry, and the receiver for controlling the operation thereof, wherein:

the voltage multiplier comprises:

an inductor having first and second terminals, wherein the first terminal of the inductor is coupled to the first battery for receiving the first voltage therefrom; a diode having an anode and a cathode, wherein the anode is coupled to the second terminal of the inductor; and a capacitor having a first terminal coupled to the cathode of the diode and a second terminal coupled to a fourth voltage of approximately zero volts and said first terminal of the capacitor is further coupled to the selected circuit; and the method comprising the steps of:

enabling the voltage multiplier for generation of the second voltage during a first time period in which the receiver is disabled by alternating between coupling the second terminal of the inductor to the fourth voltage and decoupling the second terminal of the inductor from the fourth voltage at a predetermined frequency;

disabling the voltage multiplier during a second time period in which the receiver is enabled; and powering the selected circuits with the third voltage provided by the second battery during the second time period.

2. The method according to claim 1, further comprising, substantially coincident with the disabling step, the step of:

enabling the receiver by coupling the receiver to the first battery.

3. The method according to claim 1, wherein the enabling step comprises the step of:

alternating between opening and closing, at the predetermined frequency, a switch coupled between the second terminal of the inductor and the fourth voltage.

4. The method according to claim 1, wherein the disabling step comprises the step of:

decoupling the second terminal of the inductor from the fourth voltage during the second time period when the receiver is enabled.

5. The method according to claim 4, wherein the decoupling step comprises the step of:

holding open a switch coupled between the second terminal of the inductor and the fourth voltage.

6. A radio communication device having a receiver for receiving a radio frequency (RF) signal, timing circuitry for generating time values, and a controller coupled to the receiver and the timing circuitry for generating control signals in response to the time values, the radio communication device comprising:

a first battery for generating a first voltage for powering the receiver;

a voltage multiplier coupled to the first battery for boosting the first voltage to a second voltage that is greater than the first voltage;

circuitry coupled to the receiver and the voltage multiplier for receiving the second voltage and being powered thereby;

a first switch coupled between the receiver and the first battery and to the controller for enabling the receiver for reception of the RF signal during a first time period when the first switch is closed by the controller and for disabling the receiver during a second time period when the first switch is opened by the controller;

a second switch coupled between the voltage multiplier and a ground voltage and to the controller for disabling the voltage multiplier during the first time period, when the second switch is held open by the controller, such that the second voltage is not generated by the voltage multiplier, and for enabling the voltage multiplier during the second time period when the second switch is alternately opened and closed by the controller at a predetermined frequency such that the second voltage is generated by the voltage multiplier;

a second battery for generating a third voltage greater than the first voltage; and a third switch coupled between the second battery and the circuitry and to the controller, wherein the third switch is closed during the first time period to couple the circuitry to the second battery such that the circuitry receives the third voltage and is powered thereby, and wherein the third switch is opened by the controller during the second time period.

7. The radio communication device according to claim 6, further comprising:

charging means coupled to the voltage multiplier and the second battery for charging the second battery with the second voltage generated by the voltage multiplier when the receiver is disabled.

8. The radio communication device according to claim 6, wherein the voltage multiplier comprises:

an inductor having first and second terminals, wherein the first terminal of the inductor is coupled to the first battery and the second terminal of the inductor is coupled to the second switch;

a diode having an anode and a cathode, wherein the anode is coupled to the second terminal of the inductor; and a capacitor having first and second terminals, wherein the first terminal of the capacitor is coupled to the cathode of the diode and the circuitry, and the second terminal of the capacitor is coupled to the ground voltage.

9. The radio communication device according to claim 8, wherein the second voltage generated by the voltage multiplier is approximately equal to the third voltage generated by the second battery.

10. The radio communication device according to claim 9, wherein:

the first voltage generated by the first battery is approximately 1.3 volts; and the second and third voltages are each approximately 2.6 volts.

* * * * *